Dec. 11, 1934.  C. M. READ  1,984,082
SPEED CHANGING DEVICE FOR MOVEMENT REGISTERING MECHANISM
Filed Feb. 8, 1932  2 Sheets-Sheet 1
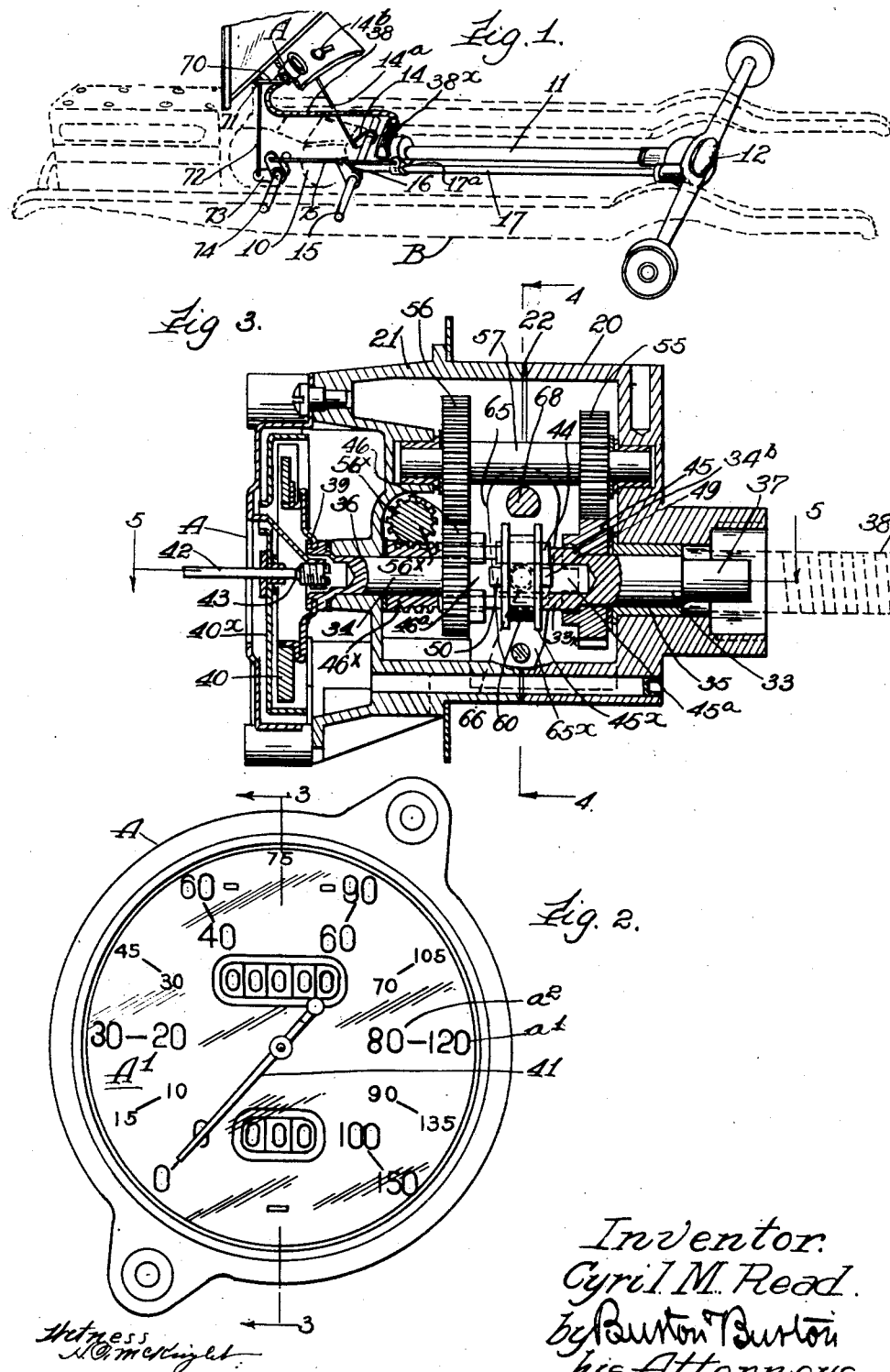
Inventor.
Cyril M. Read.
by Burton Burton
his Attorneys.

Dec. 11, 1934.    C. M. READ    1,984,082
SPEED CHANGING DEVICE FOR MOVEMENT REGISTERING MECHANISM
Filed Feb. 8, 1932    2 Sheets-Sheet 2
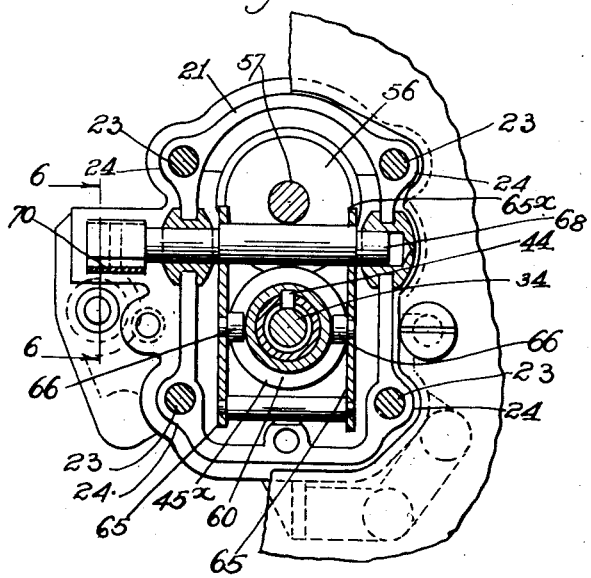
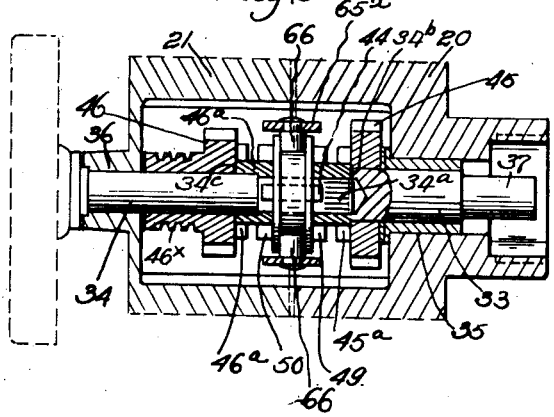
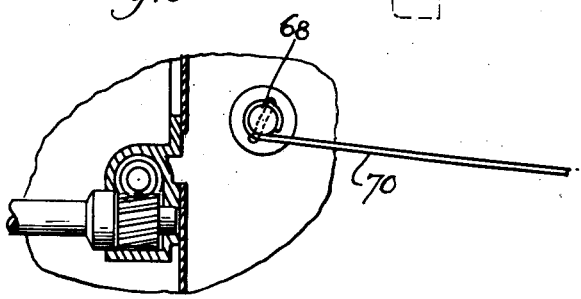
Inventor:
Cyril M. Read.
by Burton Burton
his Attorneys.
Witness.
H. F. McKnight.

Patented Dec. 11, 1934

1,984,082

UNITED STATES PATENT OFFICE 1,984,082

SPEED CHANGING DEVICE FOR MOVEMENT REGISTERING MECHANISM

Cyril M. Read, Chicago, Ill., assignor to Stewart-Warner Corporation, Chicago, Ill., a corporation of Virginia Application February 8, 1932, Serial No. 591,473

1 Claim. (Cl. 235—95)

This invention relates to speed and work indicating instruments, such as automotive vehicle speedometers which include mileage-registering devices separately named "odometers", and its purpose is to provide an instrument of that character suitable for serving a mechanism, as the driving train of an automotive vehicle, which has change speed devices in the driving connection between the power train, from which also the speedometer mechanism is driven, and the vehicle propelling wheels, by the operation of which change speed devices for changing speed, the ratio of the speed of the propelling wheels to that of the antecedent train from which the speedometer and propelling wheels are driven, is varied. And for this purpose the invention consists in providing the speedometer with means for automatically changing the ratio of the speed of the speedometer train to that of the driving-train-in-common of the speedometer and vehicle-propelling wheels, correspondingly to the change of ratio between its speed of said driving-train-in-common and its vehicle propelling wheels, so that the mileage record shall be equally correct at the different speeds.

The invention consists in the elements and features of construction shown and described, but not limited to automotive vehicle driving and speed-indicating and mileage recording mechanisms, but including any mechanism or apparatus having change speed devices, and means indicating speed with separate means for recording work done.

In the drawings:

Figure 1 is a fragmentary partly diagrammatic perspective view of an automotive vehicle equipped with this invention.

Figure 2 is a face view of the speedometer indicated at A on Figure 1.

Figure 3 is a section at the line 3—3 on Figure 2.

Figure 4 is a section at the line 4—4 on Figure 3.

Figure 5 is a section at the line 5—5 on Figure 3.

Figure 6 is a detail section at the line 6—6 of Figure 4.

Referring particularly to Figure 1 of the drawings, an automotive vehicle chassis is indicated in dotted outline by B having transmission, 10, connected by a drive shaft, 11, to a plural speed differential indicated at 12. The purpose of the plural speed differential is primarily to provide the vehicle with a normal speed for road travel, while also providing a slower speed developing more power for special requirement, as in hill climbing, or heavy hauling. At 14 there is indicated an operating lever having connection as by a link, 14$^a$, and rocking knob, 14$^b$, for operating the same by the driver, said lever fulcrumed on the frame structure as indicated by rock shaft, 15, and having a lever arm, 16, connected to a longitudinally reciprocating operating rod, 17, the rear end of which is connected to the differential for shifting the gearing to vary the gear ratio and drive speed of the axle as may be understood without detail illustration or further description.

It may be understood that when the lever, 14, is in the position indicated in Figure 1, the gearing in the differential is adjusted at low speed gear ratio so as to obtain increased power at the axle of the ground wheels, and when the lever, 14, is operated rearwardly, the rod, 17, is shifted forwardly, shifting the gearing in the differential for bringing into driving engagement a set of gears having a ratio which gives what may be referred to as the normal driving speed.

Referring to Figures 3, 4, 5 and 6: The speedometer, A, has a casing consisting of two members, 20 and 21, separable for assembling the mechanism therein, and secured together at their meeting planes, indicated at 22, by bolts, 23, through lugs, 24, 24, on the respective casing members. The casing members comprise frame structure for carrying the mechanism which includes an inleading drive shaft consisting of two members, 33 and 34, splined together, as indicated at 34$^a$, these two members being mounted respectively in journal bearings, 35 and 36, in the casing members, 20 and 21, respectively, said shaft member 33 protruding at the rear, as seen at 37, for coupling to a driving flexible shaft, indicated at 38, and shown on Figure 1 leading from the customary drive connection at the transmission, as indicated at 38$^x$. The forward end of the shaft member, 34, is connected as indicated at 39, with the magnet, 40, operating in the customary manner of a magnetic speedometer by means of the drag element, 40$^x$, for actuating over the dial A$^1$ graduated as seen at $a^1$, the index needle, 41, carried by said drag element with its spindle, 42, stepped in the customary manner, as seen at 43, Figure 3, and having the customary spring (not shown) reacting against the magnetic drag in well understood manner of magnetic speedometers.

Loosely mounted on the shaft members, 33 and 34, respectively, are gear members, 45 and 46, spaced apart longitudinally of said shaft 33, 34 and stopped at their opposite ends against the bearings, 35 and 36, respectively, and between said gear members on said shaft there is mounted for rotation with the shaft and sliding longitudinally thereon, as indicated by a key, 44, a clutch member, 45$^x$, having at its opposite ends clutching projections, 49 and 50, for cooperating with clutch recesses, 45$^a$ and 46$^a$, respectively, in the proximate ends of the gear members, 45 and 46, respectively.

Driving connection between the gears, 45 and 46, is afforded by gears, 55 and 56, mounted on a shaft, 57, journalled in the casing, said gears being dimensioned relatively to the gears, 45 and 46, for giving the gear, 46, increased speed over the gear, 45, and the shaft, 33, 34. For shifting the clutch member, 45$^x$, longitudinally of the shaft to cause the shaft to drive alternatively the gear, 45, or gear, 46, said clutch is furnished with a peripheral groove, 60 which is engaged by rollers, 66, 66, carried by the parallel arms, 65, 65, of a fork lever arm, 65$^x$, of a rock shaft, 68, which is journalled in the casing and extending out therefrom at one end, is provided with an operating arm, 70, arranged to be operatively connected, as shown in Figure 1, with the lever, 14, by which the gearing of the differential is shifted for varying the ratio between the speed of the driving shaft and the ground wheel axle.

The connection to the operating arm, 70, from the lever arm, 14, for operating said arm, 70, by movement of said lever arm, 14, derived from the manually operable knob 14$^b$, consists of a bell crank, 73, on a shaft, 74, mounted on the vehicle frame structure, a link, 75, extending from one arm of the bell crank for connection with the rod, 17, as seen at 17$^a$, the other arm of the bell crank being connected by a link, 72, with the arm, 70, as seen at 71.

The loose gear, 46, is integral with a worm, 46$^x$, which drives the worm wheel, 56$^x$, which it may be understood drives the remainder of the odometer train according to the familiar construction of odometer elements of combined instruments commercially known as speedometers. The inleading shaft member, 33, is enlarged at one end part, 33$^x$, to facilitate the spline engagement of the member, 34, as seen at 34$^a$, and incidentally to form stop shoulders, as seen at 34$^b$, and 34$^c$, for stopping longitudinally of the shaft the loose gears, 45 and 46, which are shown thus stopped at their opposite ends against the bearings, 35 and 36, as above mentioned.

It will be understood that the shaft, 33, 34, is made in two parts splined together, as described, for convenience of assembling the construction with the clutch member, 45$^x$, interposed on said shaft 33, 34 between the gears, 45 and 46, and that the casing is parted into two members, 20 and 21, as described, for like convenience of assembling the mechanism therein.

Upon considering the operation of the construction as thus far described it will be understood that the operation by the driver of the means provided for shifting the gear in the differential, 12, for changing the ratio between the speed of the driving shaft leading from the transmission and the ground wheels, will cause the shifting of the clutch member, 45$^x$, from operative engagement with the gear, 45, which drives the odometer train through the speed-increasing train comprising the gears, 55 and 56, to the gear, 46, which directly drives the odometer train indicated by the worm, 46$^x$, and worm wheel, 56$^x$ at the speed of the speedometer shaft without the increase due to the speed-increasing train; and said speed-increasing train being designed for speed increase correspondingly to that effected by the speed change gear of the differential, the result of the simultaneous shifting of the differential gear and of the clutch for change of gear connection in the speedometer, is that the movement-registration of the odometer is made to correspond with the actual rotative speed of the ground wheels due to the shift of the differential speed-change gear.

But it will be further understood that this shift leaves the speedometer shaft rotated by connection of the flexible shaft, 38, with the transmission, and thereby according to the engine speed, and will not produce any change in the angular movement of the index member of the speed-indicating dial; and in the construction shown, for affording correct speed indication corresponding to the movement-registration of the odometer when the driver makes the shift for low speed, the dial is furnished with a series of markings, as seen at $a^2$, (Figure 2) of which the speed-indicating numerals compare with those of the series, $a^1$, in accordance with the changed ratio of driving shaft speed to ground wheel shaft speed.

The unitary character of this shaft, 33, 34, is characteristic of the present invention, in that this shaft being the primary driving shaft of the speedometer mechanism is driven at all times at the speed of the flexible shaft, 38, connected as described to the inleading member, 33, of said unitary shaft, while the odometer train indicated by the initial elements, the worm, 46$^x$ and the worm gear, 56$^x$, derive changed speed as described.

I claim:

In combination with a motor vehicle having driving connections from a drive shaft to a ground wheel shaft comprising change speed connections for varying the ratio between the revolutions of the drive shaft and the ground wheel shaft, and means for adjusting said connections for predetermined changes of said ratio; a mileage travel register having a primary shaft for driving said register; driving connections to said primary shaft from the vehicle drive shaft, the mechanism of said register comprising connections adjustable for varying the driving ratio between said primary shaft and said vehicle driving shaft, and means for adjusting the same, and operating connections to said adjusting means operatively connected with the revolution-ratio-adjusting means to effect corresponding adjustment of the revolution-ratio-varying means of the mileage register.

CYRIL M. READ.